US006621595B1

United States Patent
Fan et al.

(10) Patent No.: US 6,621,595 B1
(45) Date of Patent: Sep. 16, 2003

(54) SYSTEM AND METHOD FOR ENHANCING SCANNED DOCUMENT IMAGES FOR COLOR PRINTING

(75) Inventors: Jian Fan, Cupertino, CA (US); Daniel Tretter, Palo Alto, CA (US); Qian Lin, Santa Clara, CA (US); Neerja Raman, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 09/704,358

(22) Filed: Nov. 1, 2000

(51) Int. Cl.[7] .......................... H04N 1/409; H04N 1/58; G06T 5/00; G06T 5/40; G06T 7/00
(52) U.S. Cl. ............... 358/3.26; 358/3.27; 358/462; 358/463; 358/464; 358/532; 358/2.1; 382/167; 382/172; 382/266; 382/275
(58) Field of Search .................. 358/3.26, 3.27, 358/2.1, 3.24, 1.9, 464, 463, 462, 518, 532, 530; 382/260, 261, 275, 264, 199, 176, 167, 266, 271, 172

(56) References Cited

U.S. PATENT DOCUMENTS

| 5,280,367 A | * | 1/1994 | Zuniga ..................... 358/462 |
| 5,363,209 A | | 11/1994 | Eschbach et al. ........... 358/445 |
| 5,481,628 A | | 1/1996 | Ghaderi .................... 382/261 |
| 5,539,541 A | * | 7/1996 | Ushida ...................... 358/530 |
| 5,583,659 A | * | 12/1996 | Lee et al. .................. 358/464 |
| 5,699,454 A | | 12/1997 | Nakai |
| 5,825,937 A | | 10/1998 | Ohuchi et al. .............. 382/261 |
| 5,848,181 A | | 12/1998 | Ogata |
| 5,850,298 A | | 12/1998 | Narahara |
| 2001/0050778 A1 | * | 12/2001 | Fukuda et al. ............... 358/1.9 |

FOREIGN PATENT DOCUMENTS

EP 0188193 A2 7/1986

OTHER PUBLICATIONS

J. Kittler and J. Illingworth, "Minimum Error Thresholding", Pattern Recognition, vol. 19, No. 1, 1986, pp. 41–47.

* cited by examiner

Primary Examiner—Scott Rogers (57) ABSTRACT

A system and method for enhancing scanned document images utilizes an estimated background luminance of a given digital image to remove or reduce visual "see-through" noise. The estimated background luminance is dependent on the luminance values of the edges pixels of detected text edges of the image. In one embodiment, the estimated background luminance is generated using only the edge pixels that are on the lighter side of the detected edges. In addition to the see-through removal, the system and method may further enhance the scanned document images by removing color fringes and sharpening and/or darkening edges of text contained in the images.

25 Claims, 6 Drawing Sheets

SYSTEM AND METHOD FOR ENHANCING SCANNED DOCUMENT IMAGES FOR COLOR PRINTING

FIELD OF THE INVENTION

The invention relates generally to the field of image processing, and more particularly to a system and method for enhancing scanned document images.

BACKGROUND OF THE INVENTION

Two-sided documents, i.e., documents having text and/or pictorial content on both sides of the paper, present challenges for producing quality copies of the original documents. When two-sided documents are scanned in a copy machine or a scanner, visual noise may appear in the copies that was not present on the scanned surfaces of the original documents. The visual noise may be the result of digitally captured text and/or pictorial content printed on the opposite side of a scanned surface. Visual noise may also appear in copies when multiple documents are placed on a scanning device. In this situation, the visual noise may be the result of digitally captured text and/or pictorial content on a document that was adjacent to the scanned document. The appearance of visual noise caused by unwanted text and/or pictorial content will be referred to herein as the "see-through" effect.

The see-through effect is more prevalent for copies of documents having a white or very light color background. In addition, the thickness of the scanned documents may increase the intensity of the visual noise, since thinner paper is more transparent than thicker paper. In general, documents typically contain black characters that are printed on thin white paper. Thus, the quality of document copies can be significantly increased if the visual "see-through" noise can be effectively removed from the copies.

In addition to the see-through problem, another copy quality issue arises when documents are reproduced using color scanners and color printers. This copy quality issue is the appearance of color fringes around the reproduced text. These color fringes are primarily due to scanning and printing errors. The scanning and printing errors cause the edges of the text in the copies to appear to be something other than black. The appearance of color fringes is a significant factor that degrades the overall quality of document copies.

Conventional image enhancement approaches use variations of unsharp-masking to sharpen features in digitally captured document images. For example, according to one method, the sharpness is altered in the reproduction of an electronically encoded natural scene image by applying a filter function that increases maximum local contrast to a predetermined target value and increases all other contrast to an amount proportional thereto. According to another method, an adaptive spatial filter for digital image processing selectively performs spatial high pass filtering of an input digital signal to produce output pixel values having enhanced signal levels using a gain factor that effects a variable degree of enhancement of the input pixels. Thus, the pixels with activity values that are close to an iteratively adjustable activity threshold level will be emphasized significantly less than the pixels with associated activity values that are substantially above the threshold level. In still another method, a spatial-filter performs an adaptive edge-enhancement process that enhances the sharpness of edges, which are parts of an image having steep tone gradients.

These conventional image enhancement approaches are effective for their intended purposes. However, these conventional methods do not address the problems of color fringe and see-through. In view of this deficiency, there is a need for a system and method to enhance scanned document images by eliminating or reducing color fringes and visual "see-through" noise.

SUMMARY OF THE INVENTION

A system and method for enhancing scanned document images utilizes an estimated background luminance of a given digital image to remove or reduce visual "see-through" noise. In addition to the see-through removal, the system and method may further enhance the scanned document images by removing color fringes and sharpening and/or darkening edges of text contained in the images. These image enhancements allow the system and method to significantly increase the overall quality of the scanned document images.

In an exemplary embodiment, the system includes an edge detector, a background luminance estimator, and an image enhancer. These components may be implemented in any combination of hardware, firmware and software. In one embodiment, these components are embodied in the system as software that is executable by a processor of the system.

The edge detector operates to detect edges of text contained in a given digital image containing visual noise. The background luminance estimator operates to generate a background threshold that is based on an estimation of the image background luminance. The background threshold is dependent on the luminance values of the edge pixels of the detected edges. In one embodiment, the background threshold is generated using only the edge pixels that are on the lighter side of the detected edges. The image enhancer operates to at least partially remove the visual noise by selectively modifying pixel values of the image using the background threshold. The image enhancer may also perform color fringe removal and text enhancements, such as edge sharpening and edge darkening.

In an exemplary embodiment, the method in accordance with the invention includes the steps of receiving a digital image that contains visual noise, detecting edges of text contained in the digital image, and generating a background threshold based on an estimation of the image background luminance. The background threshold is dependent on the luminance values of the edge pixels of the text edges contained in the image. In one embodiment, the background threshold is generated using only the edge pixels that are on the lighter side of the detected edges. The method further includes a step of modifying pixel values of the image using the background threshold to at least partially remove the visual noise from the image. The method may also include the step of selectively removing color data from the edges pixels to reduce color fringe or the step of enhancing the text contained in the image by sharpening or darkening the text edges.

Other aspects and advantages of the present invention will become apparent from the following detailed description, taken in conjunction with the accompanying drawings, illustrated by way of example of the principles of the invention.

DETAILED DESCRIPTION

Figure 1:
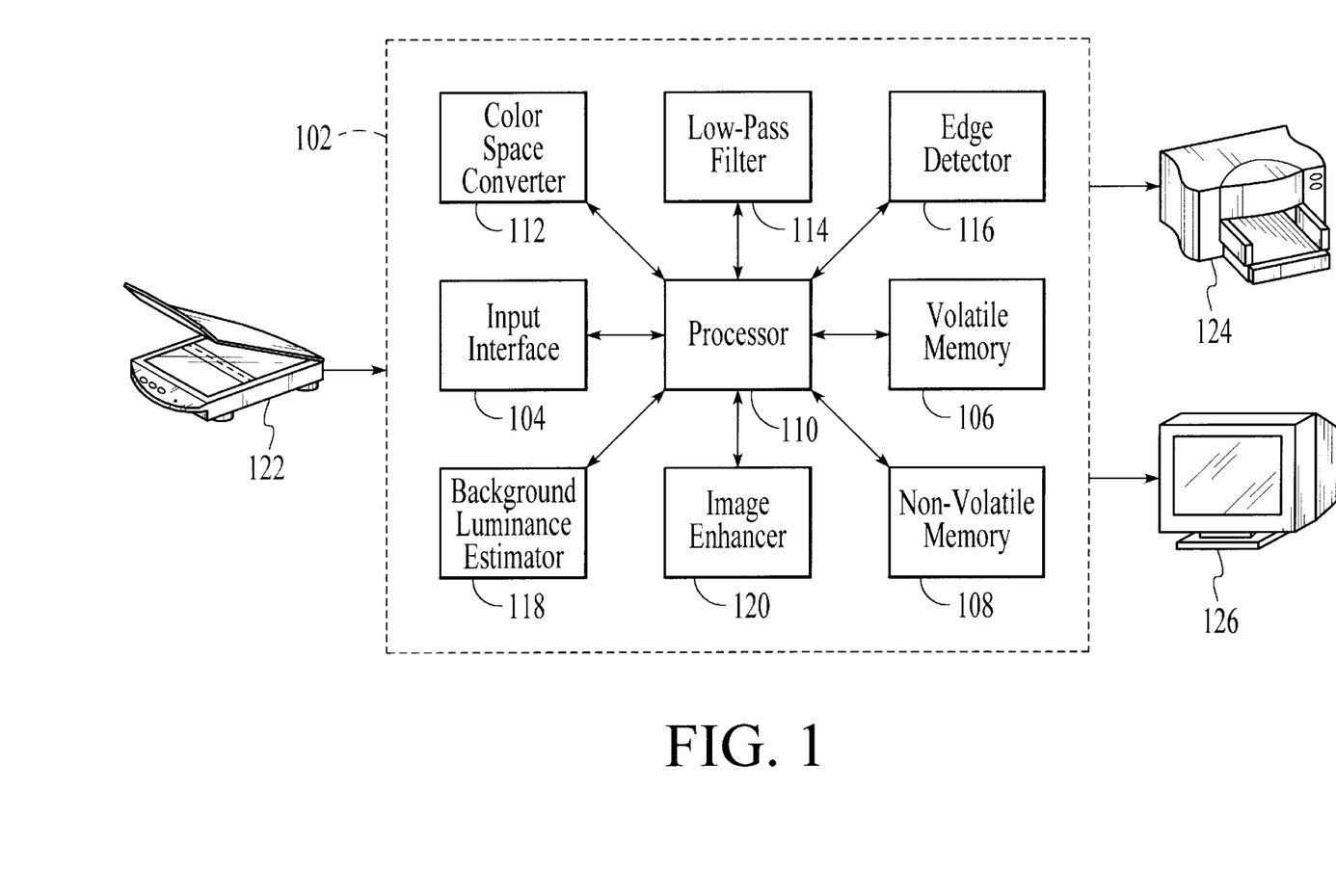
FIG. 1 is an illustration of an image enhancing system in accordance with the present invention.

With reference to FIG. 1, an image enhancing system 102 in accordance with the present invention is shown. The image enhancing system operates to perform a number of image enhancements for scanned document images. These image enhancements include text edge sharpening, text edge darkening, color fringe removal, and "see-through" removal. Color fringe is the appearance of color around the text of a scanned document image that may be due to an image capturing error. See-through is the appearance of visual noise that was captured during the scanning process. The visual noise may be the result of digitally captured text and/or pictorial content printed on the opposite side of the scanned surface. Alternatively, the visual noise may be the result of digitally captured text and/or pictorial content on an adjacent document.

The image enhancing system 102 includes an input interface 104, a volatile memory 106 and a non-volatile memory 108 that are connected to a processor 110. These components 104–110 are computer components that are readily found in a conventional personal computer. The image enhancing system further includes a color space converter 112, a low-pass filter 114, an edge detector 116, a background luminance estimator 118, and an image enhancer 120, which are also connected to the processor 110. Although the components 112–120 are illustrated in FIG. 1 as separate components of the image enhancing system 102, two or more of these components may be integrated, decreasing the number of components included in the image enhancing system. The components 112–120 may be implemented in any combination of hardware, firmware and software. Preferably, the components 112–120 are embodied in the image enhancing system 102 as a software program that performs the functions of the components 112–120 when executed by the processor 110.

The input interface 104 provides a means to receive digital images from an external image capturing device, such as a scanner 122. The input interface may be a USB port, a serial port or any other interface port that is designed to interface the image capturing device to the image enhancing system 102. Alternatively, the input interface may be a network interface to receive digital images from a local network (not shown) or from the Internet (not shown).

The color space converter 112 of the image enhancing system 102 operates to convert a scan line of an input digital image between an original color space, such as an RGB color space, and a luminance/chrominance space, such as a $YC_rC_b$ space. Although the $YC_rC_b$ space is preferred, other color spaces that include separate luminance components may be utilized. The color space conversion may be performed using a pre-calculated look-up table, which may be stored in the color space converter 112 or the non-volatile memory 108.

The low-pass filter 114 of the image enhancing system 102 operates to smooth each of the $YC_rC_b$ components of the image scan line. The low-pass filter applies a Gaussian filtering to the luminance channel Y. The Gaussian filter/mask may be designed according to the following equation.

$$G[i][j]=k\cdot\exp[-\beta^2((i-c)^2+(j-c)^2)/c^2]; \ 0\leq i<M, \ 0\leq j<M,$$

where M is an odd integer, c=(M−1)/2 is the center of the mask and k is a normalization factor such that $$\sum_{i=0}^{M-1}\sum_{j=0}^{M-1} G[i][j] = 1.0.$$

An example of such a mask (with M=5 and β=1.1) is shown below:

$$\begin{bmatrix} 0.009 & 0.023 & 0.032 & 0.023 & 0.009 \\ 0.023 & 0.058 & 0.078 & 0.058 & 0.023 \\ 0.032 & 0.078 & 0.106 & 0.078 & 0.032 \\ 0.023 & 0.058 & 0.078 & 0.058 & 0.023 \\ 0.009 & 0.023 & 0.032 & 0.023 & 0.009 \end{bmatrix}$$

For the chrominance channels $C_r$ and $C_b$, the low-pass filter 114 applies an M×M averaging filter, which is the same size as the Gaussian filter applied to the luminance channel Y. The M×M averaging filter may be seen as a special case of the Gaussian filter with β=0. However, the averaging operation can be performed more efficiently than the Gaussian filtering. The reason why Gaussian smoothing is applied to the luminance channel Y instead of averaging is that the Gaussian smoothing is needed to preserve text edge locations of the digital image.

Figure 2:
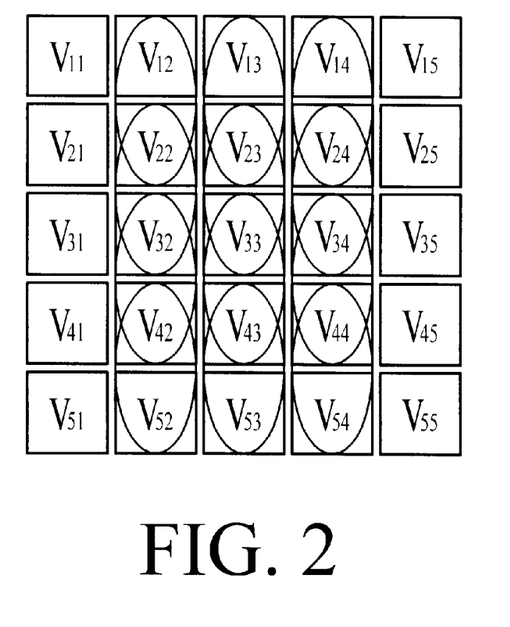
FIG. 2 is an illustration of vertical differences for the luminance channel that are used to detect text edges in accordance with the invention.
Figure 3:
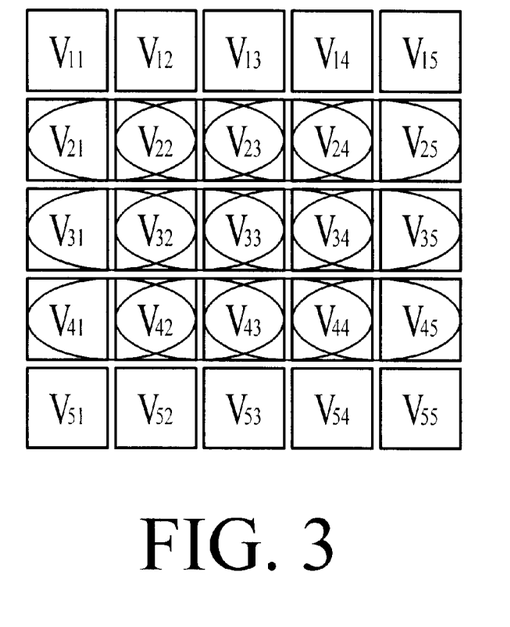
FIG. 3 is an illustration of horizontal differences for the luminance channel that are used to detect text edges in accordance with the invention.

The edge detector 116 of the image enhancing system 102 operates to detect the preserved edges of text contained in the image scan line. From the Gaussian smoothed luminance data, the edge detector calculates two metrics D1 and D2. The metric D1 is the sum of absolute values of adjacent differences. The metric D1 is used to determine whether a pixel of interest is a part of a text edge by comparing it to a threshold value $T_e$. For a pixel of interest with index (3,3), the sum D1 of absolute values of adjacent luminance differences is defined by the following equation.

$$\begin{aligned}D1 =\ &|V_{22} - V_{12}| + |V_{32} - V_{22}| + |V_{42} - V_{32}| + |V_{52} - V_{42}| + \\ &|V_{23} - V_{13}| + |V_{33} - V_{23}| + |V_{43} - V_{33}| + |V_{53} - V_{43}| + |V_{24} - V_{14}| + \\ &|V_{34} - V_{24}| + |V_{44} - V_{34}| + |V_{54} - V_{44}| + |V_{22} - V_{21}| + |V_{23} - V_{22}| + \\ &|V_{24} - V_{23}| + |V_{25} - V_{24}| + |V_{32} - V_{31}| + |V_{33} - V_{32}| + |V_{34} - V_{33}| + \\ &|V_{35} - V_{34}| + |V_{42} - V_{41}| + |V_{43} - V_{42}| + |V_{44} - V_{43}| + |V_{45} - V_{44}|,\end{aligned}$$

where the variable V stands for Gaussian smoothed luminance $\overline{Y}$. The D1 value is illustrated by FIGS. 2 and 3. FIG. 2 shows the vertical differences, while FIG. 3 shows the horizontal differences.

The metric D2 is a second-order derivative that is used to determine whether a text edge pixel is on the dark side or the bright side of the edge. The following second order derivative equation may be used to make the determination for a pixel of interest with index (3,3).

$$D2=V_{13}+V_{53}+V_{31}+V_{35}-4\cdot V_{33}$$

If D2>0, the pixel is determined to be on the dark side of the edge. Otherwise, the pixel is determined to be on the bright side of the edge.

In operation, the threshold value $T_e$ is initially set at a minimum value. In order to make the threshold value $T_e$ adaptive to some extent, the threshold value $T_e$ is allowed to float with the maximum value of the metric D1. The maximum value $D1_{max}$ is updated for every pixel, and for each image scan line, the threshold value $T_e$ is updated to $T_e = k \cdot D1_{max}$, if $T_e a < k \cdot D1_{max}$. Thus, the threshold value $T_e$ can only be increased. The minimum value of $T_e$ and the parameter k should be empirically determined by experiments.

The background luminance estimator 118 of the image enhancing system 102 operates to compute an estimated background luminance $Y_b$ for each image scan line, which is used by the image enhancer 120 for see-through removal. Initially, the estimated background luminance $Y_b$ is set to 255. The estimated background luminance $Y_b$ is then updated once per image scan line as described in detail below. The estimated background luminance $Y_b$ is computed using two histograms. The first histogram is a histogram of all pixel luminance values, and is denoted $H_y$. The second histogram is a histogram of text edge pixels on the lighter side of edges, and is denoted $H_e$. Both histograms are updated for each new pixel.

Figure 4:
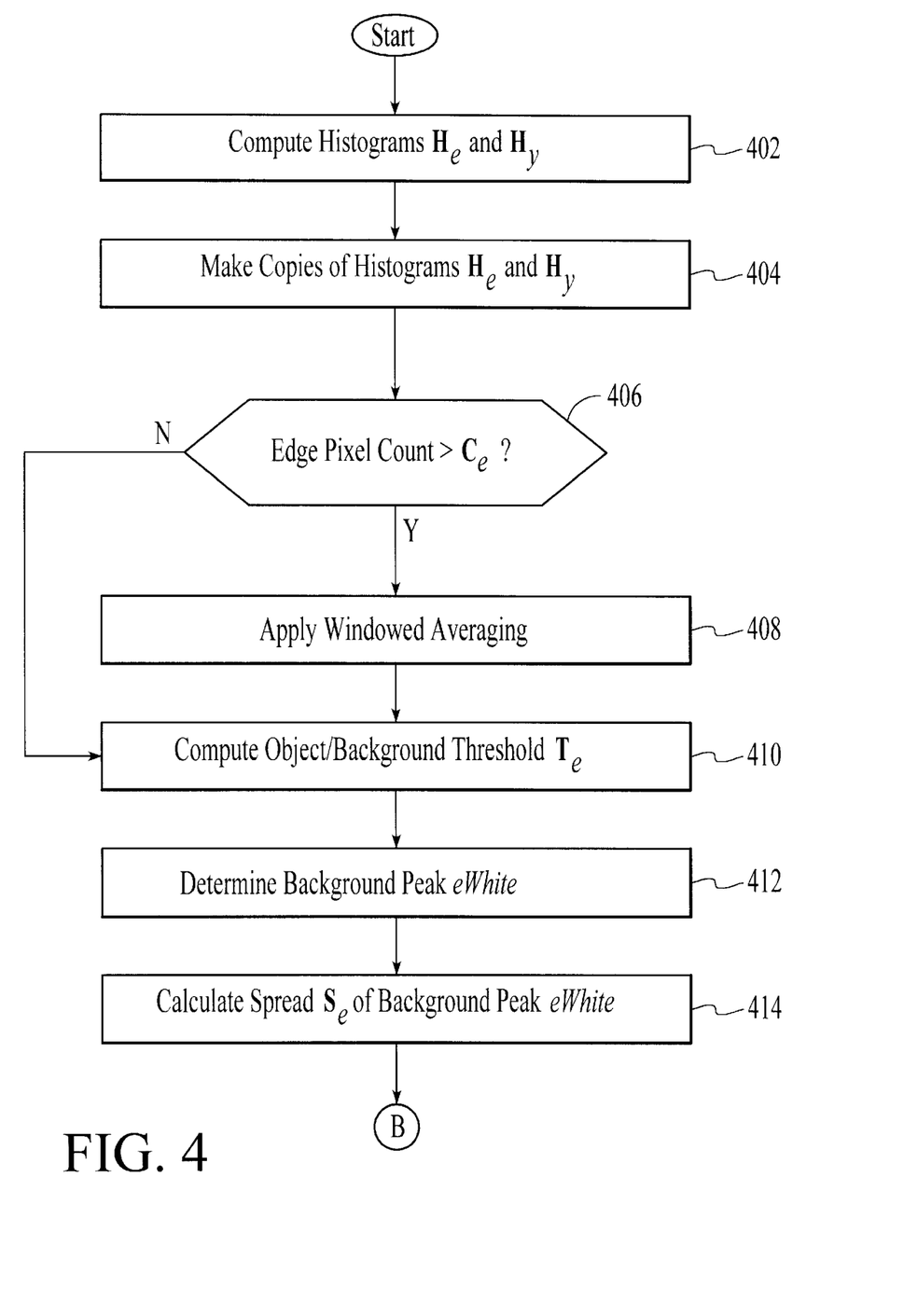
FIGS. 4 and 5 are process flow diagrams that illustrate the operation of a background luminance estimator of the image enhancing system in accordance with the invention.
Figure 5:
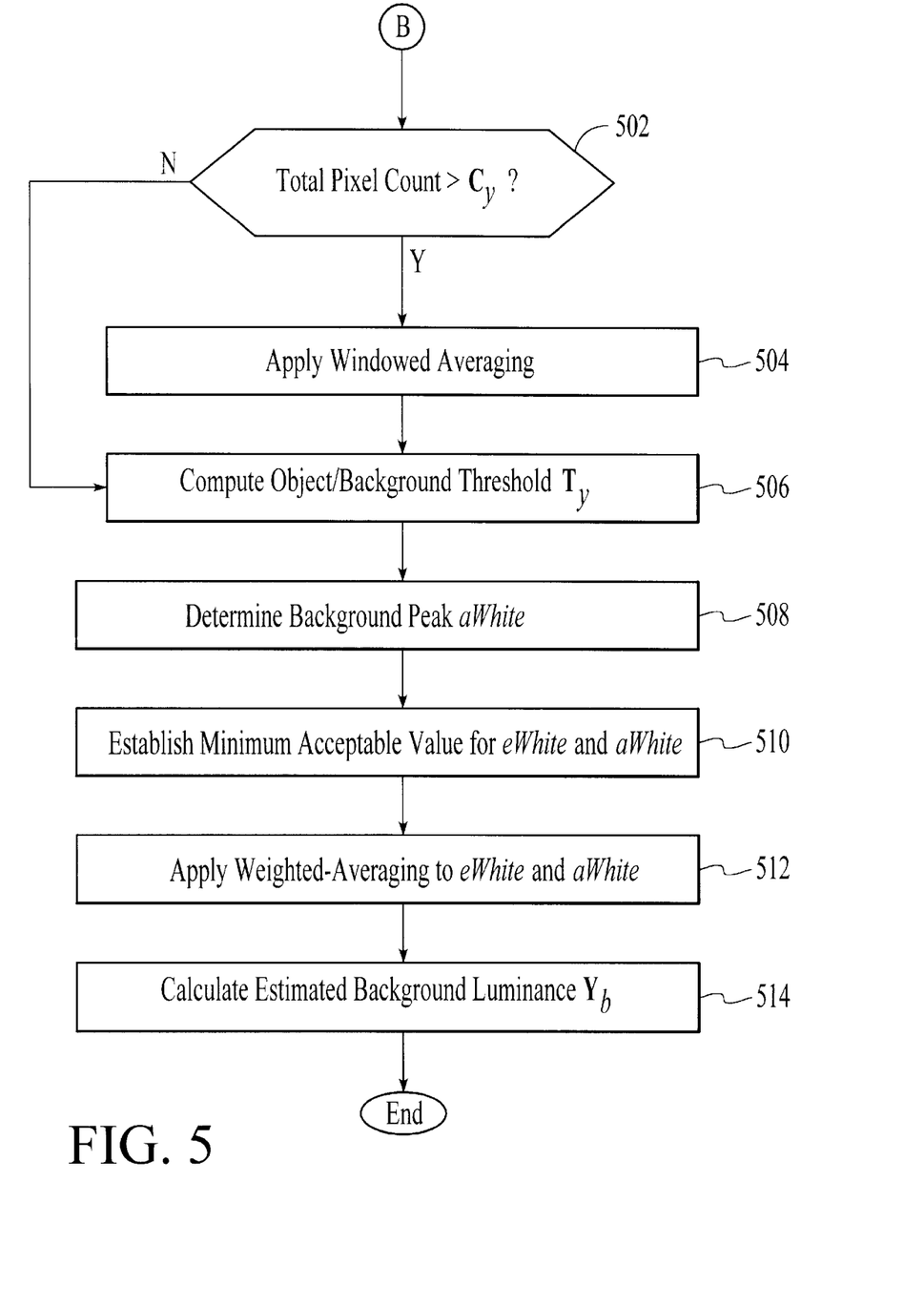

The operation of the background luminance estimator 118 to update the estimated background luminance $Y_b$ is described with reference to FIGS. 4 and 5. At step 402, the histograms $H_e$ and $H_y$ are computed. Next, at step 404, copies of the histograms $H_e$ and $H_y$ are made. The original histograms $H_e$ and $H_y$ are used to update the histograms. The copies of the histograms $H_e$ and $H_y$ are used to compute the updated estimated background luminance $Y_b$.

For the histogram $H_e$, steps 406, 408, 410, 412 and 414 are performed. At step 406, a determination is made whether the total edge pixel count (pixels on the lighter side of detected edges) is greater than a given threshold $C_e$. As an example, the threshold $C_e$ may be 100. If the total edge pixel count is greater than the threshold $C_e$, the process proceeds to step 408, at which a windowed averaging is applied to smooth out small local noise. As an example, a window size of 7 may be used for the averaging. However, if the total edge pixel count is not greater than the threshold $C_e$, the process skips to step 410. At step 410, an object/background threshold $\tau_e$ is computed. The object/background threshold $\tau_e$ is a luminance value on the histogram $H_e$ that optimally separates the dominant values of object and background intensities.

The object/background threshold τe, may be computed using Kittler-Illingsworth algorithm, as described in J. Kittler and J. Illingworth, "Minimum Error Thresholding", Pattern Recognition, Vol. 19, No. 1, 41–47, 1986, which is specifically incorporated herein by reference. For a grayscale image with pixel value g in the range of [0,n], a histogram h(g) that summarizes the gray level distribution of the image can be viewed as an estimate of the probability density function p(g) of the mixture population comprising gray levels of object and background pixels. Assuming that each of the two components (object and background) p(g/i) is a Gaussian distribution with mean $\mu_i$, standard deviation $\sigma_i$ and a priori probability $P_i$, the probability density function p(g) can be expressed by the following equation.

$$p(g) = \sum_{i=1}^{2} P_i p(g/i),$$

where $$p(g/i) = \frac{1}{\sqrt{2\pi}\,\sigma_i} \exp\left(-\frac{(g-\mu_i)^2}{2\sigma_i^2}\right).$$

For a given p(g/i) and $P_i$, there exists a threshold τ that satisfies the following conditions.
 For $g \leq \tau$, $P_1 p(g/1) > P_2 p(g/2)$
 For $g > \tau$, $P_1 p(g/1) < P_2 p(g/2)$
However, the parameters $\mu_i$, $\sigma_i$ and $P_i$ are unknown.

The Kittler-Illingsworth algorithm utilizes an arbitrary level T to threshold the gray level data and model each of the resulting pixel populations by a normal density h(g|i,T) with parameters $\mu_i(T)$, $\sigma_i(T)$ and $P_i(T)$, which are defined by the following equations.

$$P_i(T) = \sum_{g=a}^{b} h(g),$$

$$\mu_i(T) = \left[\sum_{g=a}^{b} h(g)g\right] \Big/ P_i(T) \text{ and}$$

$$\sigma_i^2(T) = \left[\sum_{g=a}^{b} \{g - \mu_i(T)\}^2 h(g)\right] \Big/ P_i(T),$$

where $$a = \begin{cases} 0, & i=1 \\ T+1, & i=2 \end{cases} \text{ and } b = \begin{cases} T, & i=1 \\ n, & i=2 \end{cases}.$$

These definitions are used to express a criterion function J(T) which characterizes the average performance of replacing a gray level g by a correct binary value. The criterion function J(T) is defined by the following equation.

$$J(T) = \sum_{g=0}^{T} h(g) \cdot \left\{\left[\frac{g-\mu_1(T)}{\sigma_1(T)}\right]^2 + 2\log\sigma_1(T) - 2\log P_1(T)\right\} +$$

$$\sum_{g=T+1}^{n} h(g) \cdot \left\{\left[\frac{g-\mu_2(T)}{\sigma_2(T)}\right]^2 + 2\log\sigma_2(T) - 2\log P_2(T)\right\}$$

Substituting the equations for $\mu_i(T)$, $\sigma_i(T)$ and $P_i(T)$ into the criterion function J(T) yields the following equation.

$$J(T) = 1 + 2[P_1(T)\log\sigma_1(T) + P_2(T)\log\sigma_2(T) - 2[P_1(T)\log P_1(T) + P_2(T)\log P_2(T)]$$

The optimal threshold τ, or a minimum error threshold, is determined by finding a value that minimizes the above equation.

After the object/background threshold $\tau_e$ is computed, a background peak eWhite on the histogram $H_e$ is determined, at step 412. The background peak eWhite corresponds to the peak in the upside range between the object/background threshold $\tau_e$ and 255 on the histogram $H_e$. At step 414, a spread index $S_e$ is calculated. The spread index $S_e$ is defined as $S_e = (I_{high} - I_{low})/256$, where $I_{high}$ and $I_{low}$ are high and low luminance values of the spread that fall to half of the peak value. The $I_{high}$ value is located on the left side of the eWhite value, while the $I_{high}$ value is located on the right side of the eWhite value.

For the histogram $H_y$, steps 502, 504, 506 and 508 are performed. At step 502, a determination is made whether the total pixel count is greater than a given threshold $C_y$. As an example, the threshold $C_y$ may be 10,000. If the total edge pixel count is greater than the threshold $C_y$, the process proceeds to step 504, at which a windowed averaging is then applied to smooth out small local noise. As an example, a window size of 7 may be used for the averaging. However, if the total pixel count is not greater than the threshold $C_y$, the process skips to step 506. At step 506, an object/background threshold $\tau_y$ is computed. Similar to the object/background threshold $\tau_e$, the object/background threshold $\tau_y$ is a luminance value on the histogram $H_y$ that optimally separates the dominant values of object and background intensities. At step 508, a background peak aWhite on the histogram $H_y$ is determined. The background peak aWhite corresponds to the peak in the upside range between the object/background threshold $\tau_y$ and 255 on the histogram $H_y$.

Although the steps 406–414 and 502–508 have been described in a sequential order, these steps do not have to be performed in the described order. The steps 406–414 and 502–508 may be performed such that steps 406–414 are interweaved with steps 502–508. Alternatively, some of the steps 502–508 may be performed simultaneously with steps 406–414.

Next, at step 510, a minimum acceptable value MIN_WHITE is established for the background peaks eWhite and aWhite by embedding MIN_WHITE in a non-linear function $f$. That is, eWhite'=$f$(eWhite) and aWhite'=$f$(aWhite). The simplest of such functions is a two segment linear function as defined below.

$$f(v) = \begin{cases} v, & \text{if } v > \text{MIN\_WHITE} \\ \text{MIN\_WHITE}, & \text{otherwise} \end{cases}$$

However, for images with mostly black figures and little unprinted regions, the background peaks eWhite and aWhite are usually far below the minimum acceptable value. In these cases, it may be desirable to reduce the effect of see-through removal that will be performed by the image enhancer 120 of the system 102, or even to not apply the see-through removal. This can be effectively realized by functions such as the following limiting function.

$$f(v) = \begin{cases} v, \text{if } v > \text{MIN\_WHITE} \\ (255.0 - \text{MIN\_WHITE}) \cdot \exp(-(r \cdot \text{MIN\_WHITE}/255 \cdot v/255)^2) \\ + \text{MIN\_WHITE}, \text{otherwise} \end{cases}$$

Figure 6:
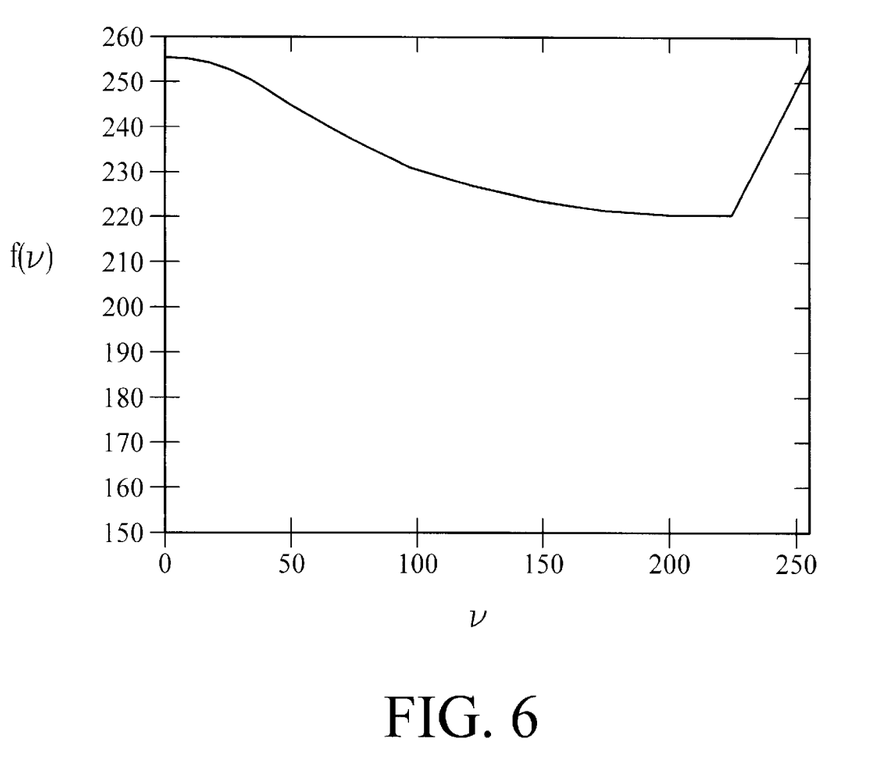
FIG. 6 shows an exemplary limiting function that may be used by the background luminance estimator.

A limiting function $f(v)$ with MIN_WHITE=220 and r=3.5 is shown in FIG. 6. Other functions characterized by three distinct regions may also be used to achieve a similar effect. The three distinct regions are as follows: 1) a linear region from 255 down to MIN_WHITE for effective see-through removal; 2) a flat holding-up region from MIN_WHITE down to a set value; and 3) a gradual blackout region.

Next, at step 512, weighted-averaging is applied to the background peaks eWhite and aWhite using the following formula to derive an initial background luminance white(n) for the current line n.

$$\text{white}(n) = p \cdot \text{eWhite}' + (1-p) \cdot \text{aWhite}'$$

where $$p = \begin{cases} 0.8 \cdot (1 - S_e) + 0.2, & \text{if number of edge pixels in } H_e > C_e \\ 0.2, & \text{otherwise} \end{cases}$$

At step 514, the estimated background luminance $Y_b$ is calculated using the following formula.

$$Y_b(n+1) = \beta(n) \cdot Y_b(n) + (1-\beta(n)) \cdot \text{white}(n);$$

$$Y_b(0) = 255;$$

$$\beta(n) = \beta_{max} - (\beta_{max} - \beta_{min}) \cdot \exp(-g \cdot n/H),$$

where n is the current line number, H is the height (in pixels) of the image and g is the adaptation boost. As an example, the parameters $\beta_{min}$, $\beta_{max}$, and g may be set as follows: $\beta_{min}$=0.9; $\beta_{max}$=0.995; and g=10. The above formula introduces a spatial (scan line) dependent smoothing for see-through effect in the vertical direction.

Turning back to FIG. 1, the image enhancer 120 of the image enhancing system 102 operates to enhance a given document image by performing text edge sharpening, text edge darkening, color fringe removal, and see-through removal. The enhancement operations that are performed by the image enhancer differ for edge and non-edge pixels of the image, as described in the following C-style pseudo-code.

```
if D1 > T_e        { // edge pixel
    Y_out = (k + 1) · Y − k · Ȳ;    // unsharp-masking
    if D2 > 0    // pixel on dark side of edge
    Y_out = (Y_out · 3)/4;    // darkening
    if (|C̄_r| + |C̄_b|) < T_C{    // low-chroma edge pixel,
        strip color
        C_r^out = 0;
        C_b^out = 0;
    }
    else {                // keep the original color
        C_r^out = C_r;
        C_b^out = C_b;
    }
    Y^out C_r^out C_b^out ⇒ R^out G^out B^out;
}
else {  // non-edge pixel
    YC_rC_b ⇒ RGB;
    // see-through removal/background control
    R^out = Q(R, Y_b);
    G^out = Q(G, Y_b);
    B^out = Q(B, Y_b);
}
```

In the above pseudo-code, the parameter $T_c$ is a "colorful" threshold for determining the application of color fringe removal, and parameter k is a positive value for determining the strength of the edge sharpening. As an example, $T_c$=15 and k=2.5 may be used.

The function Q for see-through removal can take several forms. The simplest form is the following two-segment linear function.

$$Q(x, Y_b) = \begin{cases} 255, & \text{if } x > Y_b \\ x \cdot 255/Y_b, & \text{otherwise} \end{cases}$$

A more complex form is the following continuous non-linear function, which is commonly used for tone modification.

$$Q(x, Y_b) = \begin{cases} 255, & \text{if } x > Y_b \\ 255 \cdot [1.0 - 0.5 \cdot (2(Y_b - x)/Y_b)^\alpha]^{1/\gamma}, & \text{else if } x > Y_b/2 \\ 255 \cdot [0.5 \cdot (2x/Y_b)^\alpha]^{1/\gamma}, & \text{otherwise} \end{cases}$$

In the above equation, the parameters $\alpha$ and $\gamma$ control the contrast and the gamma, respectively. In order to increase computational speed, the function $Q(x,Y_b)$ can be implemented as a look-up table and updated for each scan line. After the enhancement operations, the enhanced image may be output to a printer 124 or a display 126, as shown in FIG. 1. Although the image enhancing system 102 has been described as a separate system, the system may 102 be a sub-system that is part of a larger system, such as a copying machine (not shown).

Figure 7:
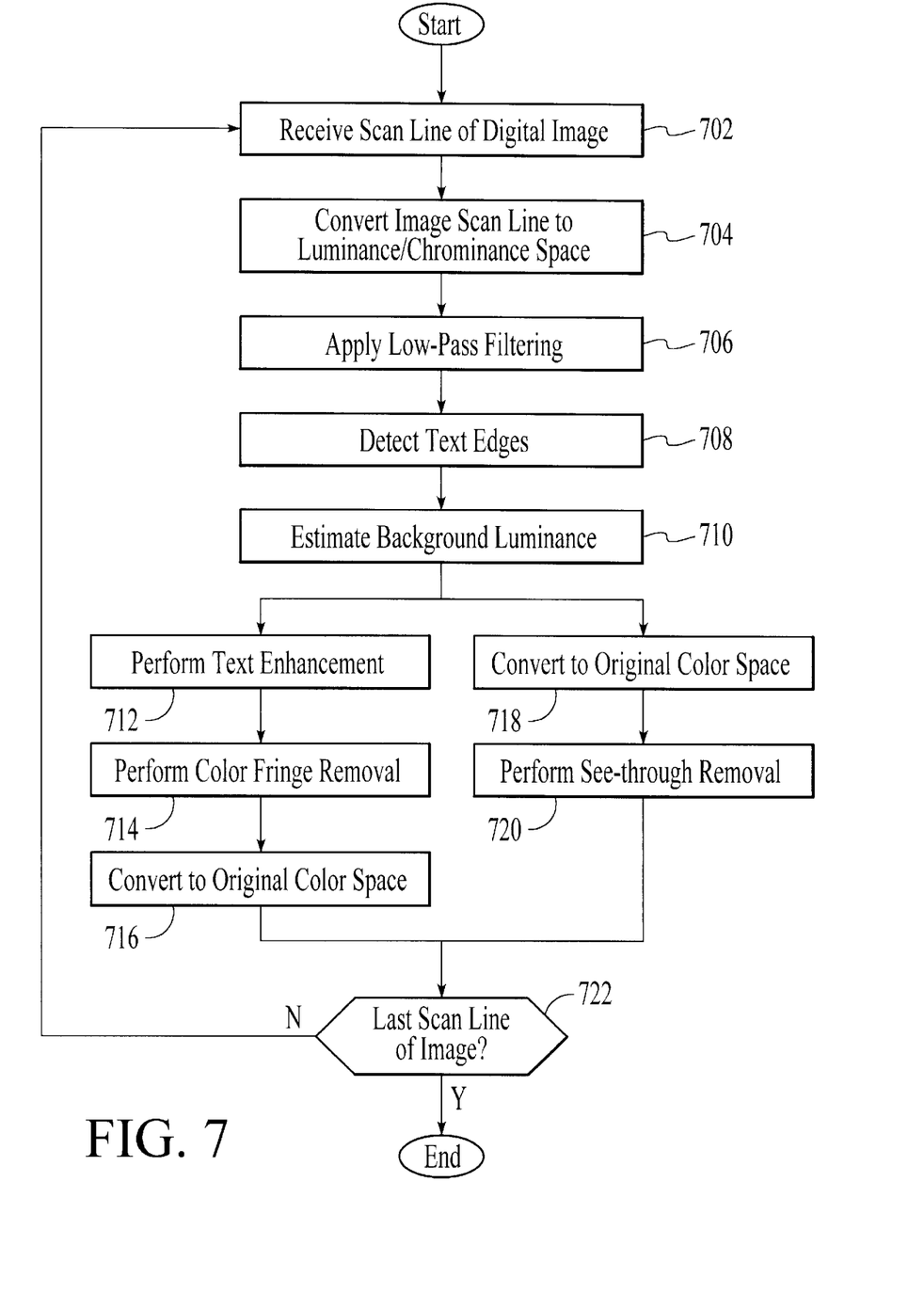
FIG. 7 is a process flow diagram of a method for enhancing scanned document images in accordance with the invention.

A method of enhancing scanned document images in accordance with the invention is described with references to FIG. 7. At step 702, a scan line of a digital image is received. The digital image may be a scanned image of a document that contains text and/or pictorial content. At step 704, the image scan line is converted from the original color space to a luminance/chrominance space. As an example, the original color is space may be an RGB space, and the luminance/chrominance space may be a $YC_rC_b$ space. At step 706, low-pass filtering is applied to luminance/chrominance channels. A Gaussian filter is applied to the luminance channel, while an averaging filter is applied to both chrominance channels.

Next, at step 708, text edges are detected by identifying edge pixels and then classifying the edge pixels on the basis of whether the pixels are on the dark side or the bright side of the edge. The edge detection involves calculating D1 and D2 values. The D1 value is used to identify the edge pixels using an adaptive threshold $T_e$. The D2 value is used to classify the edge pixels.

Next, at step 710, the background luminance is estimated to derive an estimated background luminance $Y_b$. For edge pixels, steps 712, 714 and 716 are performed. At step 712, text enhancement is performed on the edge pixels. The text enhancement includes edge sharpening and/or edge darkening. At step 714, color fringe removal is performed for the edge pixels. The edge pixels are then converted to the original color space, e.g., an RGB space, at step 716. For non-edge pixels, steps 718 and 720 are performed. At step 718, the non-edge pixels are converted to the original color space. A see-through removal is then performed on the non-edge pixels, at step 720.

Next, at step 722, a determination is made whether the current image scan line is the last scan line of the image. If it is the last scan line, the method comes to an end. However, if the current image scan line is not the last scan line of the image, the method proceeds back to step 702 to receive the next scan line of the image. The steps 702–722 are repeated until the last scan line of the image has been processed.

What is claimed is:

1. A method of enhancing digital images comprising:
   receiving an input digital image containing visual noise;
   detecting edges of a feature within said input digital image;
   generating a background threshold based on an estimation of background luminance of said input digital image, said background threshold being dependent on luminance values of edge pixels of said edges; and
   selectively modifying pixel values of said input digital image using said background threshold to at least partially remove said visual noise from said input digital image.

2. The method of claim 1 wherein said step of generating said background threshold includes using only said edge pixels that are on a lighter side of said edges of said feature to generate said background threshold.

3. The method of claim 1 wherein said step of generating said background threshold includes locating a first peak on a first histogram of selected luminance values of said edge pixels that likely corresponds to said background luminance.

4. The method of claim 3 wherein said step of locating said first peak on said first histogram includes computing a minimum error threshold of said first histogram.

5. The method of claim 3 wherein said step of generating said background threshold further includes locating a second peak on a second histogram of selected luminance values of pixels of said input digital image that likely corresponds to said background luminance.

6. The method of claim 5 wherein said step of generating said background threshold includes calculating the spreads of luminance distributions of said first and second histograms defined by said first and second peaks.

7. The method of claim 1 wherein said step of receiving, said step of detecting, said step of generating, and said step of selectively modifying are performed for individual scan lines of said input digital image, said background threshold being undated for each scan line of said input digital image.

8. The method of claim 7 wherein said background threshold is dependent on a previously computed background threshold to reduce differences in pixel modification between two adjacent scan lines of said input digital image.

9. The method of claim 1 wherein said step of selectively modifying said pixel values of said input digital image includes selectively removing color data from said edge pixels to reduce color fringe.

10. The method of claim 1 further comprising a step of enhancing said feature of said input digital image by sharpening or darkening said edges of said feature.

11. A system for enhancing an input digital image containing visual noise comprising:
    means for detecting edges of a feature within said input digital image;
    means for generating a background threshold based on an estimation of background luminance of said input digital image, said background threshold being dependent on luminance values of edge pixels of said edges; and
    means for selectively modifying pixel values of said input digital image using said background threshold to at least partially remove said visual noise from said input digital image.

12. The system of claim 11 wherein said generating means is configured to generate said background threshold using only said edge pixels that are on a lighter side of said edges of said feature.

13. The system of claim 11 wherein said generating means is configured to locate a peak on a histogram of selected luminance values of said edge pixels that likely corresponds to said background luminance.

14. The system of claim 13 wherein said generating means is configured to compute a minimum error threshold of said histogram to locate said peak on said histogram.

15. The system of claim 14 wherein said generating means is further configured to calculate the spread of a luminance distribution of said histogram defined by said peak.

16. The system of claim 11 wherein said selectively modifying means is configured to selectively remove color data from said edge pixels to reduce color fringe.

17. The system of claim 11 wherein said detecting means, said generating means and said selectively modifying means are configured to operate on a line-by-line basis such that a single scan line of said input digital image is processed at a time.

18. The system of claim 17 wherein said generating means is configured to update said background threshold for each scan line of said input digital image such that modification of said pixel values of said input digital image for a current scan line of said input digital image is dependent on a previously processed scan line.

19. A program storage medium readable by a computer, tangibly embodying a program of instructions executable by said computer to perform method steps for enhancing an input digital image containing visual noise, said method steps comprising:

detecting edges of a feature within said input digital image;

generating a background threshold based on an estimation of background luminance of said input digital image, said background threshold being dependent on luminance values of edge pixels of said edges; and selectively modifying pixel values of said input digital image using said background threshold to at least partially remove said visual noise from said input digital image.

20. The program storage medium of claim 19 wherein said step of generating said background threshold includes using only said edge pixels that are on a lighter side of said edges of said feature to generate said background threshold.

21. The program storage medium of claim 19 wherein said step of generating said background threshold includes locating a peak on a histogram of selected luminance values of said edge pixels that likely corresponds to said background luminance.

22. The program storage medium of claim 21 wherein said step of locating said peak on said histogram includes computing a minimum error threshold of said histogram.

23. The program storage medium of claim 21 wherein said step of locating said peak on said histogram includes calculating the spread of a luminance distribution of said histogram defined by said peak.

24. The program storage medium of claim 19 wherein said step of detecting, said step of generating, and said step of selectively modifying are performed for individual scan lines of said input digital image, said background threshold being undated for each scan line of said input digital image.

25. The program storage medium of claim 19 wherein said step of selectively modifying said pixel values of said input digital image includes selectively removing color data from said edge pixels to reduce color fringe.

* * * * *